US 6,692,839 B2

(12) United States Patent
Zhang et al.

(10) Patent No.: US 6,692,839 B2
(45) Date of Patent: Feb. 17, 2004

(54) TITANIUM BASED COMPOSITES AND COATINGS AND METHODS OF PRODUCTION

(75) Inventors: Deliang Zhang, Hamilton (NZ); Wei Gao, Birkenhead (NZ); Danyang Ying, Hamilton (NZ); Zhengwei Li, Grafton (NZ); Zhihong Cai, Hamilton (NZ); Jing Liang, Mt. Albert (NZ)

(73) Assignee: Titanox Developments Limited, Auckland (NZ)

(*) Notice: Subject to any disclaimer, the term of this patent is extended or adjusted under 35 U.S.C. 154(b) by 0 days.

(21) Appl. No.: 10/119,268

(22) Filed: Apr. 9, 2002

(65) Prior Publication Data

US 2003/0190487 A1 Oct. 9, 2003

(51) Int. Cl.[7] ................................. B32B 9/00
(52) U.S. Cl. ................. 428/472.2; 428/558; 501/89; 501/95.2; 501/96.1
(58) Field of Search .................. 428/615, 639, 428/640, 650, 651, 660, 697, 698, 702; 501/134, 153, 95.2, 96.1, 96.3, 89; 416/241 R, 241 B

(56) References Cited

U.S. PATENT DOCUMENTS 6,551,371 B1 * 4/2003 Furuta et al. ................. 75/235

OTHER PUBLICATIONS

Gao et al, High–Temperature Oxidation Resistance of $Ti_3AlO–Al_2O_3$ Composite, 2001 Joint Conference of Scenz/Feanz/EMG. Apr. 9–10, 2001, Auckland pp. 124–126.

Schicker et al, Reaction Synthesized $Al_2O_3$–Based Intermetallic Composites, 1998 Acta Metallurgica, Inc., vol. 46, No. 7, pp. 2485–2492, 1998.

Schnicket et al, Novel Reaction–Based Processing of Co–Continuous Ceramic–Metal Composites, Key Engineering Materials, vols. 127–131 (1997), pp. 73–80.

Gaus et al, Alumina–Aluminide Alloys (3A) Technology: II, Modeling of $Ti_xAl_y–Al_2O_3$ Composites Formation, J. Am. Ceram. Soc., 83 (7) 1606–1612 (2000).

Claussen et al, Reaction Sintering of Alumina–Aluminide Alloys (3A), J. Mater. Res., vol. 11, No. 11, Nov. 1996.

Gaus et al, Alumina–Aluminide Alloys (3A) Technology: I, Model Development, J. Am. Ceram. Soc., 83 (7) 1599–1605 (2000).

* cited by examiner

Primary Examiner—Deborah Jones
Assistant Examiner—Arden Sperty
(74) Attorney, Agent, or Firm—Andrus, Sceales, Starke & Sawall, LLP

(57) ABSTRACT

A titanium based composite which includes a Ti(Al,O) base matrix, discrete ceramic particles, and an oxide layer on the surface of the composite. The discrete ceramic particles are integrally associated with the Ti(Al,O) base matrix and the oxide layer, so that at a temperature of above about 600° C., the composite is substantially resistant to oxidation and spallation.

5 Claims, 8 Drawing Sheets

SEM micrograph of the $\alpha$-Ti(Al,O)/$Al_2O_3$ composite produced by sintering the Al/$TiO_2$ composite powder at 1550°C for 1 hour. The dark particles are $Al_2O_3$.

Fig. 1: SEM micrograph of the α-Ti(Al,O)/Al$_2$O$_3$ composite produced by sintering the Al/TiO$_2$ composite powder at 1550°C for 1 hour. The dark particles are Al$_2$O$_3$.

Fig. 2: SEM micrographs of the Ti$_3$Al/Al$_2$O$_3$ composite produced by pressureless sintering of the Al/TiO$_2$ composite powder at (a) 1550°C and (b)1650°C for 1 hour respectively.

(a)                           (b)

Fig. : SEM backscattered electron micrographs of $Ti_3Al$-10vol.%SiC samples produced by HIPping at 1000°C for 2 hours under 200 MPa: (a) 2 h milled and (b) 8 h milled.

Fig. Surface and cross-section morphologies of Ti(Al,O)/Al$_2$O$_3$ composite after oxidation at 700°C isothermally for 100 hours: (a) surface morphology; (b) and (c) cross-section morphology.

Fig. : Cross-section of Ti$_3$Al/20%TiC composite samples oxidised at 800°C in air for 200 hrs; (a) produced using 8hrs milled powder, and (b) produced using 16hrs milled powder.

Fig : SEM micrographs of the Ti₃Al-10vol% SiC powder particles after different milling durations. (a) 2 hours; (b) 4 hours; (c) 8 hours; and (d) 16 hours.

TITANIUM BASED COMPOSITES AND COATINGS AND METHODS OF PRODUCTION

TECHNICAL FIELD OF THE INVENTION

The invention relates to the use of titanium based composites for use in component manufacture, or for use as coatings, with improved resistance to high-temperature oxidation and spallation. The invention also relates to titanium-based composites and to methods of production.

BACKGROUND TO THE INVENTION

Titanium based alloys and intermetallic compounds are, in general, known. For example, titanium aluminide ($Ti_3Al$) based intermetallic compounds are attractive structural materials for applications in the aerospace and automobile industries because of their low density, high melting point, and high specific strength and excellent mechanical properties. However, the industrial application of such materials has been limited.

$Ti_3Al$ based intermetallic compounds show a relatively low ductility and poor high-temperature oxidation resistance. Temperatures over approximately 650° C. cause cracking to the oxide layer of these $Ti_3Al$ based compounds. This leads to spallation of the outer oxide layer of the compounds and rapid oxidation of the underlying material. Continued exposure of the $Ti_3Al$ based compounds to such environments eventually leads to the degradation and destruction of the materials. For these reasons, Ti based alloys and intermetallic compounds have been restricted in application to temperatures below 650° C., as at about this temperature the materials become oxidised quickly.

$Al_3Ti$ coating, obtained using conventional pack cementation, can improve the oxidation resistance of $Ti_3Al$, because the outer oxide layer or scale formed is composed mainly of $\alpha\text{-}Al_2O_3$. However, such coatings are not ideal as they form small but permeable cracks, which penetrate the coating layers and compromise the oxidation resistance. As a result the materials have limited applications.

To improve the mechanical and oxidation properties, $Ti_3Al$ has been alloyed with Nb, Cr, Mo, Si and/or W and this has shown some benefits. The main problem with alloying methods is that one special element cannot improve all required properties to a desirable level. Multi-element alloying is therefore often used, and microstructural control with thermal or thermo-mechanical treatment is required in most cases. Such methods are complicated and expensive.

It will be appreciated by those skilled in the art that if titanium based materials are to have a wider range of commercial applications at high temperatures, they must be substantially resistant to oxidation and spallation at high temperatures; easy to prepare and fabricate; and be cost efficient.

OBJECT OF THE INVENTION

With the above background in mind, it is an object of this invention to provide titanium based composite materials which address or at least ameliorate disadvantages of known titanium based alloys and intermetallic compounds, or at least which will provide the public with a useful alternative.

Further objects of this invention will become apparent from the following description which is given by examples only.

SUMMARY OF THE INVENTION

According to one aspect of this invention there is provided a titanium based composite which includes a Ti(Al,O) base matrix, discrete ceramic particles, and an oxide layer on the surface of the composite, wherein the discrete ceramic particles are integrally associated with the Ti(Al,O) base matrix and the oxide layer, and wherein, at a temperature of above about 600° C., the composite is substantially resistant to oxidation and/or spallation.

Preferably the discrete ceramic particles range in size from 0.1 μm to 30 μm.

Preferably the discrete ceramic particles are selected from $Al_2O_3$, SiC, TiC, TiN, $TiB_2$, $Y_2O_3$ and/or $Si_3N_4$.

Preferably the discrete ceramic particles may constitute a volume fraction of about 10% to 60% of the titanium based composite.

According to a further aspect of this invention there is provided a coating material including titanium based composite adapted for use on substrate components used at high temperature and/or in oxidative environments, wherein the composite includes a Ti(Al,O) base matrix, discrete ceramic particles and an oxide layer, wherein the discrete ceramic particles are integrally associated with the Ti(Al,O) base matrix and the oxide layer so that at a temperature of above about 600° C. the composite is substantially resistant to oxidation and/or spallation.

Preferably the discrete ceramic particles range in size from 0.1 μm to 30 μm.

In one preferred form the discrete ceramic particles are selected from $Al_2O_3$, TiC, SiC, TiN or $TiB_2$.

Preferably the ceramic particles constitute a volume fraction of about 10% to 60% of the titanium based composite.

Preferably the composite is resistant to oxidation and/or spaliation at temperatures between 600° C. and 900° C. and more preferably above 700° C.

According to a further aspect of this invention there is provided a method of producing a coating for application to a component used at temperatures above 600° C. and/or in oxidative environments, wherein the method includes the steps of:

preparing a Ti(Al,O) based composite powder, with each of the powder particles including discrete $Al_2O_3$ particles, according to the mechanical milling and thermal treatment method disclosed in PCT/NZ98/00124;

applying the composite powder produced to a substrate component to produce a composite coating; and exposing the coated component to a high temperature, oxidative environment above about 600° C. to form a surface oxide layer on the composite coating.

Preferably the composite powder is applied to the substrate using a thermal or plasma spray process.

Preferably the coated component is heated to between about 700° C. and about 900° C. for between about 1 and 200 hours in an oxygen containing environment to form the surface oxide layer.

Preferably the coated component is heated in an oven before use or is heated in situ during use.

According to a further aspect of the invention, there is provided a process for producing a titanium based composite material in a pre-selected form including the steps of:

preparing a Ti(Al,O) based composite powder with each of the powder particles, including discrete $Al_2O_3$ particles, according to the mechanical milling and thermal treatment method disclosed in PCT/NZ98/00124;

pressing the powder formed into a pre-selected mould to produce a powder compact and sintering the powder compact at a temperature of above about 700° C. under an inert environment;

exposing the sintered composite material or component to a high temperature, oxidative environment above about 700° C. to form a surface oxide layer;

wherein the product produced is substantially resistant to oxidation and/or spallation at temperatures above 600° C.

Preferably the sintering temperature is between 700° C. and 1650° C.

Preferably the inert environment is a vacuum or argon environment.

According to a further aspect of this invention there is provided a method of producing a coating for application to a component used at temperatures above 600° C. and/or in oxidative environments, wherein the method includes the steps of:

preparing a Ti(Al,O) based composite powder, with each of the powder particles including discrete TiC, SiC, TiN, $TiB_2$, $Y_2O_3$ and/or $Si_3N_4$ particles, according to the mechanical milling method disclosed in PCT/NZ98/00124;

applying the composite powder produced to a substrate component to produce a composite coating; and exposing the coated component to a high temperature, oxidative environment above about 600° C. to form a surface oxide layer on the composite coating.

Preferably the composite powder is applied to the substrate using a thermal or plasma spray process.

Preferably the coated component is heated to between about 700° C. and about 900° C. for between about 1 and 200 hours in an oxygen containing environment to form the surface oxide layer.

Preferably the coated component is heated in an oven before use or is heated in situ during use.

Preferably the component is to be used at temperatures between 600° C. and 900° C.

According to a further aspect of the invention, there is provided a process for producing a titanium based composite material in a pre-selected form including the steps of:

preparing a Ti(Al,O) based composite powder, with each of the powder particles including discrete TiC, SiC, TiN, $TiB_2$, $Y_2O_3$ and/or $Si_3N_4$ particles, according to the mechanical milling method disclosed in PCT/NZ98/00124;

pressing the powder formed into a pre-selected mould to produce a powder compact and sintering the powder compact at a temperature of above about 700° C. under an inert environment;

exposing the sintered composite material or component to a high temperature, oxidative environment above about 700° C. to form a surface oxide layer;

wherein the product produced is substantially resistant to oxidation and/or spallation at temperatures above 600° C., preferably between 600° C. and 900° C.

Preferably the sintering temperature is between 700° C. and 1650° C.

Preferably the inert environment is a vacuum or argon environment.

Other aspects of the invention will become clear from the disclosure below which is given by way of example only with reference to the figures.

DESCRIPTION OF FIGURES

The present invention will be described with reference to the accompanying figures in which.

DETAILED DESCRIPTION OF THE INVENTION

Figure 1:
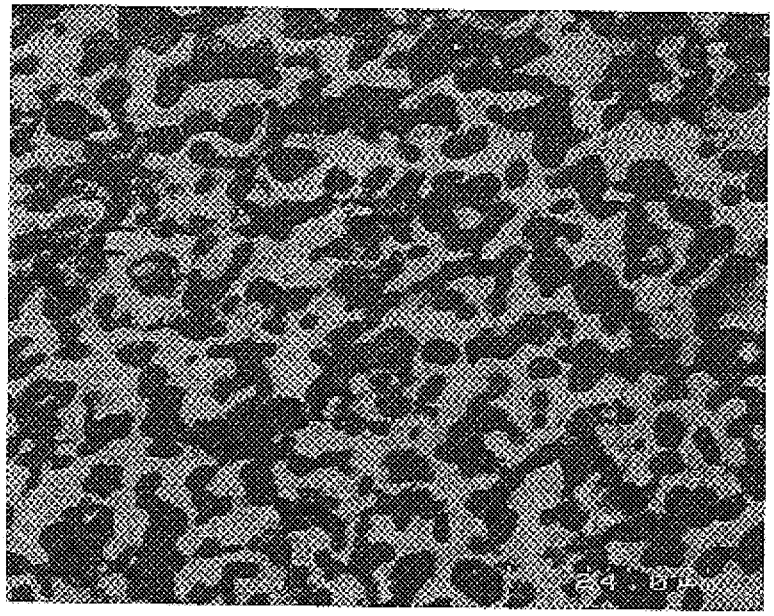
FIG. 1 shows a SEM micrograph of the Ti(Al,O)/$Al_2O_3$ composite produced by sintering the Al/$TiO_2$ composite powder at 1550° C. for 1 hour. The dark particles are $Al_2O_3$ particles.

The formation of composites is a relatively new approach to the use of titanium based materials. The present invention is directed at the selection and use of high temperature and oxidation resistant titanium based composites, for producing components of use in industries such as the aerospace and automobile industries.

Applications for titanium based composites can include coatings for engine components, such as compressor discs and blade rings, which are used in high temperature and highly oxidative environments. Such uses require a satisfactory level of resistance to oxidation and damage of the coating and the underlying substrate component. The composites can also be used to form the component itself. The present invention may also be seen to relate to a process for preparing such composites and the application of them to engineering components.

The titanium based composites of the present invention include a titanium base matrix referred to herein by the general formula Ti(Al,O); discrete ceramic particles; and an oxide layer on the surface of the composite.

The Ti(Al,O) matrix is primarily composed of titanium, aluminium and oxygen. Preferably the titanium matrix includes about 0.1 at. % to about 30 at. % dissolved oxygen and about 15 at. % to about 30 at. % aluminium.

The discrete ceramic particles are selected from $Al_2O_3$, SiC or TiC. Other ceramic particles of use will include TiN and $TiB_2$. Other alternatives, such as $Y_2O_3$ and $Si_3N_4$, known to the skilled person can also be used.

When the discrete ceramic particles are $Al_2O_3$, the composite is preferably produced using the process as disclosed in PCT/NZ98/00124 and its corresponding U.S. Pat. No. 6,264,719 (the disclosure of which is incorporated herein by way of reference). The process first produces a $TiO_2$/Al composite powder by high energy mechanical milling. This composite powder consists of fine fragments including a mixture of fine phases mainly of $TiO_2$ and Al, having a particle size of less than about 500 nm. Then the $TiO_2$/Al composite powder is thermally treated to facilitate the reaction between $TiO_2$ and Al, forming Ti(Al,O)/$Al_2O_3$ composite powder. For the other ceramic particles (SiC, TiC etc) this thermal treatment step is omitted. Using SiC as an example, the powder will be produced by the mechanical milling of SiC powder, Ti powder, and Al powder, followed by the same later steps as for $Al_2O_3$. Proportions used would be determined by the composition of the final material as desired. The volume fraction of the discrete ceramic particles in the powder may vary in range of about 10% to 60%.

Preferably the discrete ceramic particles have a circular equivalent diameter in the range of about 0.1 μm to about 30 μm. The diameter of the particles may be varied according to the desired use for a composite.

When the composite powder is to be used to coat a substrate material (eg metal blades etc), the composite powder is thermally or plasma sprayed onto a substrate material (eg on engine component) at temperatures above about 1000° C. The techniques of thermal or plasma spraying (or alternatives) will be known in the art. This effectively forms the titanium based matrix of the composite material on the substrate surface that is then subject to oxidation to form a surface oxide layer on that base matrix.

When producing pre-selected shaped products from the composite material, the composite powder produced via the mechanical milling is pressed into a mould to form a powder compact of the desired shape. This powder compact is then sintered at temperatures above about 700° C. for at least 30 minutes to form the base composite material which is then subject to oxidation to form the surface oxide layer. This process can be used to form components (rotor blades and the like) that are used at high temperatures in oxidative environments. Example 3 uses such a sintered composite for isothermal and cyclic oxidation experiments.

The surface oxide layer is formed onto the titanium based matrix (plus discrete particles) by oxidation of the surface of the matrix. When the titanium based composites are exposed to air or other oxygen containing atmospheres at temperatures in the range of 700° C. to 900° C., or higher, for a suitable period of time, an oxide layer (or scale) forms on the outer surface of the composite exposed to the oxygen containing environment from oxidation of the matrix base. The oxide layer is primarily composed of $TiO_2$ but may also include some $Al_2O_3$ particles. Depending on the composition of the titanium based composite, temperature and oxygen partial pressure in the atmosphere, the oxide layer may take any time from about 1 to about 200 hours to form.

The oxide layer forms on the base matrix and around the discrete ceramic particles in the base matrix and, as a result, the particles cross the boundary between the base matrix and the oxide layer, assisting in tying the two layers together.

Typically, the oxide layer formed on titanium based alloys or intermetallic compounds, such as $Ti_3Al$ have traditionally had poor scale spallation resistance under the thermal stress generated by cyclic heating of and cooling to a temperature in the range of 600° C. to 900° C. Under such conditions, the oxide layer becomes cracked and falls off. This process is called spallation. The spallation of the outer oxide layer exposes the under surface of the oxide layers which rapidly oxidises and cracks. This cycle of rapid oxidation, cracking and spallation leads to the eventual degradation and destruction of the titanium based materials.

It has been surprisingly found that the titanium based composites, which include discrete particles, as are herein described, have superior high-temperature (ie above 600° C.) oxidation resistance. They also show superior resistance to spallation caused by thermal stress generated by cyclic heating and cooling; from room temperature to about 900° C.

Not wishing to be bound by a specific hypothesis, it appears that the discrete particles embedded in the composite form a network in the composite that crosses into the oxide layer. The oxide layer forms a tight adhesion with the discrete embedded particles as well as the Ti(Al,O) matrix. At high temperatures, the interface between the oxide layer, the Ti(Al,O) base matrix and the discrete particles shows no sign of detachment, indicating an excellent adhesion between these phases, as shown by the double arrows in FIG. 4.

Thermal cyclic experiments have been conducted using the titanium based composites which include discrete particles. Ti(Al,O)/$Al_2O_3$, Ti(Al,O)/SiC and Ti(Al,O)/TiC composites which include discrete particles have shown resistance to cracking of the oxide layer at temperatures as high as 900° C., thus avoiding spallation and subsequent oxidation of the composite. This is further described in Example 3.

The surprisingly good adhesion of the oxide layer to the composite surface in high temperature oxygen containing environments is also believed to be due in part to the composition of the oxide layer. The oxide species which form the oxide layer of the composite surface appear to be able to form strong bonds with the discrete particles and thus allow the particles to serve as mechanical locking devices to aid the adhesion of the oxide layer to the surface of the composite.

As the outer oxide layer of the titanium based composites herein described are substantially resistant to cracking and spallation at high temperatures of up to about 900° C., the composites have broad use in a variety of engineering applications.

A further aspect of this invention therefore is the use of titanium based composites, including a titanium based matrix, an oxide layer, and discrete ceramic particles, as a coating to provide protection to engineering components (substrates) which will be used in high temperature oxygen containing environments up to about 900° C. Without being restrictive, the protective coating may be applied to engine blades; outer surface coatings on engine surfaces; or automobile brake surfaces amongst others. In this way the composite may be used to provide protection to the substrate surface against an oxygen containing atmosphere. As the composite is stable at temperatures as high as 900° C., the likelihood of the composite decomposing or degrading, exposing the base material to oxidation, is substantially reduced. This also reduces the likelihood of damage to an engine, for example, by the decomposition of the composite.

Another significant advantage of the composites herein described, particularly when used as a coating for substrates such as engine components (for example) is that the coated component can be pre-treated to form the surface oxide layer (as has been described previously herein) before the component is put in place on the engine. The component is thus pre-prepared in a controlled manner for use in the high temperature environment.

Alternatively, simple use of the component in the high temperature environment (ie above 600° C.) would cause the oxide layer to form in situ. This is less preferred as the surface oxide layer formation is less able to be controlled but the option is available.

As discussed earlier, the composite can be applied in a number of ways. In a preferred embodiment the composite can be prepared in a powder form, and the composite powder may be sprayed on to a substrate by using a thermal or plasma spray process where the powder is heated to a temperature above typically 1000° C. and then blown on to the surface of a component at a high speed, using the known art of thermal spray and plasma spray processes.

With reference to the Figures, the titanium based composite Ti(Al,O)/Al$_2$O$_3$, shown in FIG. 1 was produced by sintering the TiO$_2$/Al composite powder produced by high energy mechanical milling of TiO$_2$ powder with an aluminium metal reducing agent. The mechanical milling typically occurs at temperatures below 100° C. for 0.5 to 10 hours under argon or vacuum. The quantity and/or proportion of reactants used is given in Example 1. The component ratios can be varied as desired by the user. This high energy mechanical milling process is as specified in PCT/NZ98/00124 and its corresponding U.S. Pat. No. 6,264,719, the disclosure of which is incorporated herein by reference.

Typically, at the end of such a milling process, there will be produced an intermediate blended powder comprising fine fragments including a fine mixture of TiO$_2$ and Al phases. The powder fragments include TiO$_2$ and Al particles with a fragment size of each phase of about 500 nm.

To produce products from new composite materials according to this invention, the TiO$_2$/Al composite powder is then pressed into a mould and sintered under an inert atmosphere (eg Argon or similar gases, or under vacuum) at a temperature in the preferred range of between about 1400° C. and 1650° C. for at least 30 minutes. This produces the titanium based composite which includes discrete Al$_2$O$_3$ particles. Preferably the heat treatment is maintained at about 1400° C. for a period of up to about 4 hours inclusive, although sintering temperatures down to about 700° C. can also be used, as discussed below. This process forms the base composite material.

In some cases unwanted reactions may occur during sintering at temperature ranges this high. When applied pressure is used the required sintering temperature can be lowered to a substantial extent. As an example, where an intermediate powder to produce Ti(Al,O)/Al$_2$O$_3$ composite powder is hot isostatically pressed under a pressure of about 200 MPa, the sintering temperature may be reduced to about 1200° C. to achieve fully dense Ti(Al,O)/Al$_2$O$_3$ composite powder.

When forming composites with SiC or TiC for example, to achieve a fully dense Ti(Al,O)/SiC or Ti(Al,O)/TiC composite powder compact, a temperature of 800° C. is sufficient where the intermediate powder is hot isostatically pressed under a pressure of 200 MPa. It should again be noted that the thermal treatment during the mechanical milling stage is not used for SiC or TiC.

In the case of forming a coating of Ti(Al,O)/Al$_2$O$_3$ on a substrate material, following thermal treatment of the composite powder (as per PCT/NZ98/00124) the composite powder is then applied to the substrate metal (eg engine component etc) as a coating, preferably via thermal or plasma spray processes. Via such application processes the composite powder is heated to a temperature of about 1000° C. then blown onto the component surface at high speed. Such application processes and alternatives to them will be known to the skilled person.

The titanium composite powder coated component, or the titanium composite formed component, is then heated to a temperature of 600° C. to 900° C. in an oxygen containing environment to produce the surface oxide layer on the composite powder coating. The controlled oxidation environment can be produced using an oven or flame furnace or like apparatus. Alternatively the component can simply be used and an oxide layer will form in situ, under temperature/oxidation conditions.

As previously mentioned the size of the discrete particles can be varied by modifying the composite preparation conditions, or the heating conditions. For example, the Al$_2$O$_3$ particle size can be increased by increasing the heat treatment temperature. If the temperature is increased from 1500° C. to 1650° C., the Al$_2$O$_3$ particle size may be increased on average from 15 µm to 30 µm.

FIG. 1 illustrates a SEM micrograph of a titanium based composite of Ti(Al,O)/Al$_2$O$_3$ formed by pressureless sintering of the composite powder compact at 1550° C. for 1 hour. The process is best described by Example 1. The Ti(Al,O)/Al$_2$O$_3$ composite is consistent with Al$_2$O$_3$ ceramic particles embedded in the Ti(Al,O) matrix. The dark patches shown by the micrograph are Al$_2$O$_3$ particles. The circular equivalent diameter of the Al$_2$O$_3$ particles embedded in the Ti(Al,O) matrix is in the range of about 0.1 µm to about 30 µm. FIG. 1 does not show the presence of the surface oxide layer of the composite.

Figure 2:
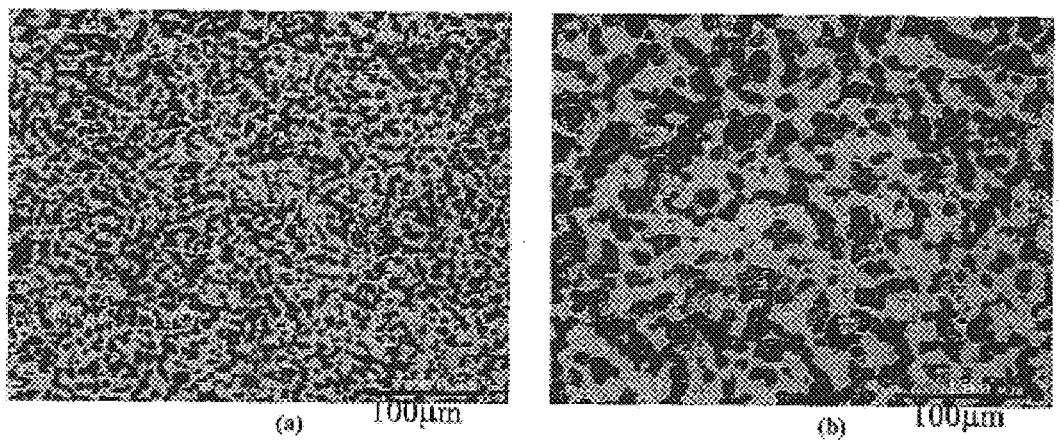
FIG. 2 shows SEM micrographs of the Ti(Al,O)/$Al_2O_3$ composite produced by pressureless sintering of the Al/$TiO_2$ composite powder at (a) 1550° C. and (b) 1650° C. for 1 hour respectively.

With reference to FIG. 2(a), an SEM micrograph of the Ti(Al,O)/Al$_2$O$_3$ composite produced by pressureless sintering of the Al/TiO$_2$ composite powder at 1550° C. is illustrated. The Al$_2$O$_3$ particles are shown as dark regions in the Ti(Al,O) matrix. FIG. 2(b) illustrates a Ti(Al,O)/Al$_2$O$_3$ composite produced by pressureless sintering of the Al/TiO$_2$ composite powder at 1650° C. The process for production is otherwise as described for FIG. 1. The Al$_2$O$_3$ particle can be seen to be substantially larger when the Ti(Al,O)/Al$_2$O$_3$ composite is prepared at a sintering temperature of 1650° C. (FIG. 2(b)) than when the Ti(Al,O)/Al$_2$O$_3$ composite is prepared at the lower temperature of 1550° C. (FIG. 2(a)). As can be seen in FIG. 2(b) more than 50% of the Al$_2$O$_3$ ceramic particles are interconnected.

Figure 3:
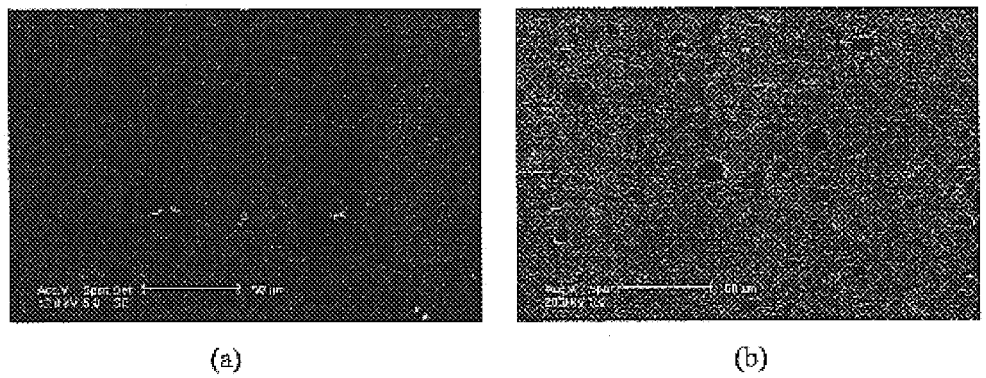
FIG. 3 shows SEM backscattered electron micrographs of the Ti(Al,O)/SiC composite which include 10 vol. % SiC ceramic particles. The composite is produced by HIPping at 1000° C. for 2 hours under 200 MPa: (a) 2 h milled and (b) 8 h milled.

FIGS. 3(a) and 3(b) illustrate an SEM micrograph of a titanium based composite which includes SiC particles. The composites were produced by HIPping at 1000° C. for 2 hours under 200 Mpa. The Si powder, Ti powder and Al powder were mechanically milled for (3a) 2 hours and (3b) 8 hours prior to pressing and sintering. The Ti(Al,O)/SiC composites illustrated in FIGS. 3(a) and 3(b) are consistent with SiC particles embedded in the Ti(Al,O) matrix. The SiC ceramic particles are illustrated as dark regions in the micrograph. SiC particles are in the range of 0.1 µm to 10 µm. The Ti(Al,O)/SiC composite is reinforced with a 10% volume fraction of SiC particles. Again, the Figures do not show the presence of the surface oxide layer.

Figure 4A:
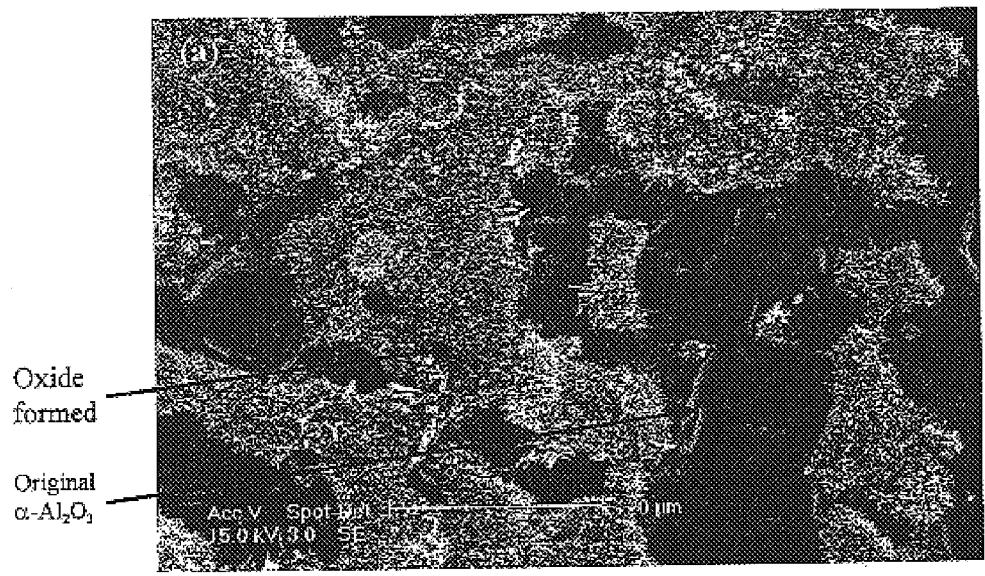
FIG. 4 shows surface and cross-section morphologies of Ti(Al,O)/$Al_2O_3$ composite after oxidation at 700° C. isothermally for 100 hours: (a) surface morphology; (b) and (c) cross-section morphology.
Figure 4B:
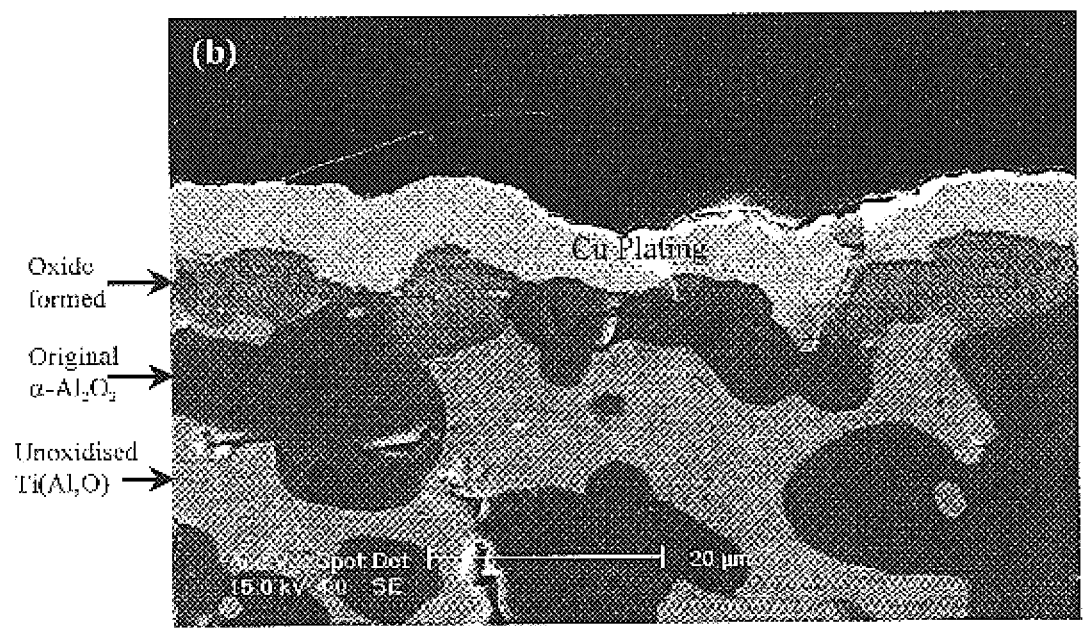
Figure 4C:
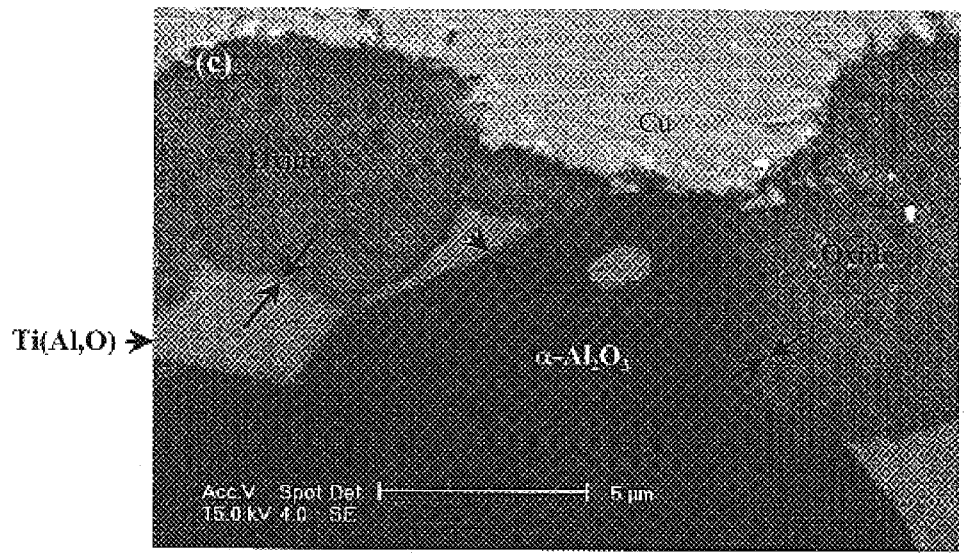
Figure 5:
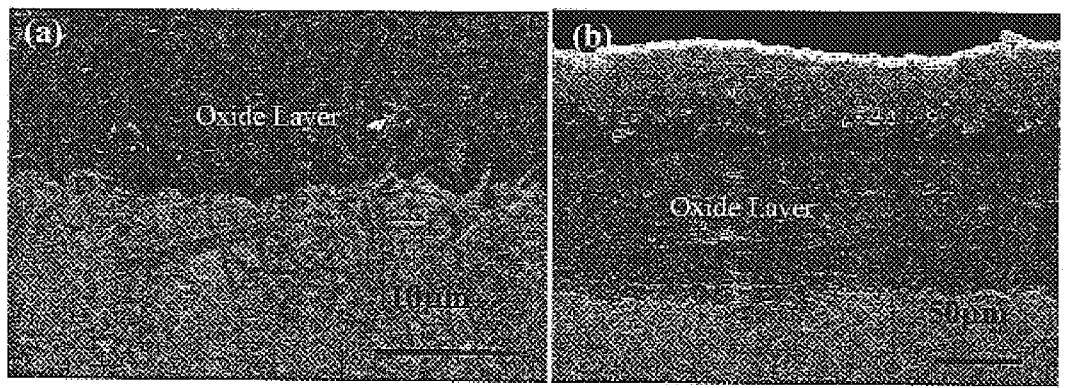
FIG. 5 shows a cross-section of Ti(Al,O)/TiC composite with 20 vol. % of TiC oxidised at 800° C. in air for 200 hours; (a) produced using 8 hrs milled powder, and (b) produced using 16 hrs milled powder.
Figure 6:
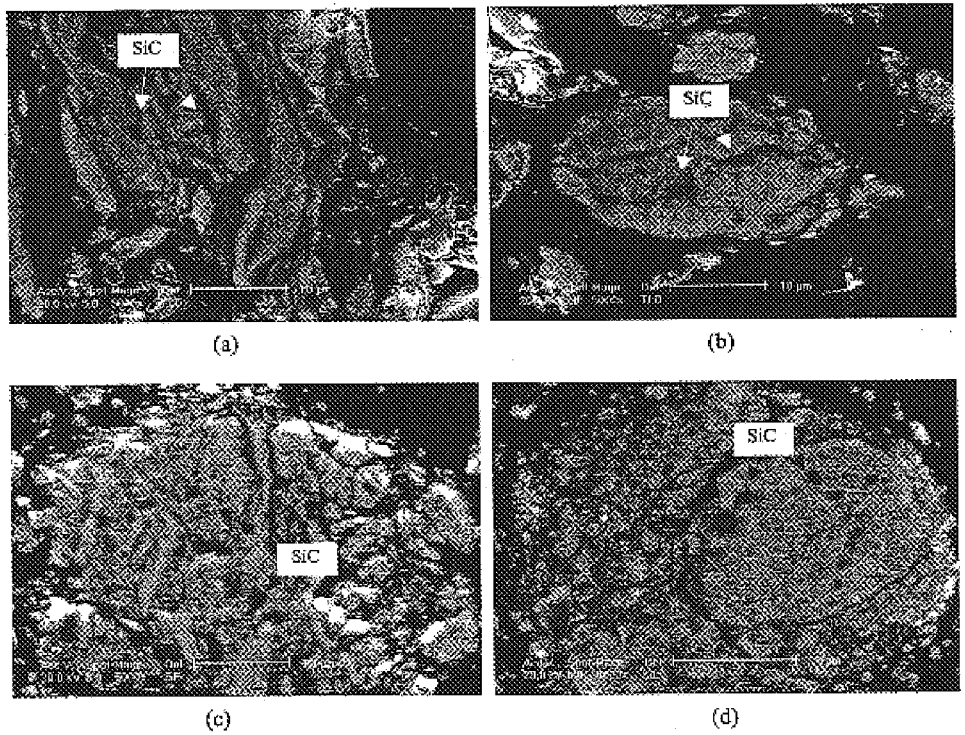
FIG. 6 shows SEM micrographs of the Ti(Al,O)/SiC with 10 vol. % of SiC powder particles after different milling durations (a) 2 hours; (b) 4 hours; (c) 8 hours; and (d) 16 hours.

FIGS. 4 and 5 show SEM micrographs including the oxide layer formed on the titanium based composite products formed as for FIG. 1.

FIGS. 4(a) to 4(c) show the morphologies of a Ti(Al,O)/Al$_2$O$_3$ composite after exposure to an oxygen environment at a temperature of 700° C. for 100 hours. The cross-over of the discrete Al$_2$O$_3$ particles can be seen. FIG. 4(a) illustrates a Ti(Al,O)/Al$_2$O$_3$ composite in which the outer surface of the composite or surface exposed to air is partially covered by the oxide layer as shown by light patches on the surface. From the cross-section morphologies in FIGS. 4(b) and 4(c) it can be seen that the Al$_2$O$_3$ particles are well embedded in the Ti(Al,O) matrix and are integrally associated with the oxide layer formed following oxidation of the matrix.

FIGS. 5(a) and 5(b) illustrate a cross section of a titanium based composite which includes TiC ceramic particles (Ti(Al,O)/TiC). The composite was produced as for the SiC material of FIG. 3. FIG. 5a shows a product produced following 8 hours mechanical milling and 5b after 16 hours milling. The Ti(Al,O)/TiC composite compact sample was heated to 800° C. in air for 200 hours. The TiC embedded particles are not visible in the SEM micrographs. The oxide layer can be seen on the surface of the composite and is indicated.

FIGS. 6(a) to (d) illustrate SEM micrographs of the Ti(Al,O)/SiC composite powder produced after different milling durations. The presence of the SiC particles can clearly be seen as darker areas.

The invention will now be described with reference to the Examples below.

EXAMPLE 1

Preparation

The Ti(Al,O)/Al$_2$O$_3$ composite powder was fabricated through high energy ball milling of a mixture of TiO$_2$ and Al powders, followed by pressureless sintering at 1550° C. for 1 to 5 hours under argon. It consists of ~50 vol. % α-Al$_2$O$_3$ particle. The milling was as described in PCT/NZ98/00124. The sintered bar was cut to rectangular samples with a dimension of ~14×9×1 mm. FIG. 1 best illustrates the Ti(Al,O)/Al$_2$O$_3$ produced by this process. Before oxidation test, all surfaces were ground to 1200 grit SiC, cleaned with alcohol and acetone, and then drying in hot air.

EXAMPLE 2

Characterisation of Ti(Al,O)/Al$_2$O$_3$ Composite

Surfaces of a Ti(Al,O)/Al$_2$O$_3$ composite sample as produced in Example 1 were ground and polished down to 1 μm diamond paste for SEM observation. FIG. 1 shows the typical micrographs. The dark patches are α-Al$_2$O$_3$, while the white patches are Ti(Al,O) matrix. In the macroscopic scale, α-Al$_2$O$_3$ particles incorporated into Ti(Al,O) homogeneously. However, it could be observed that smaller particles of α-Al$_2$O$_3$ and Ti(Al,O) were mixed with each other.

EXAMPLE 3

Isothermal and Cyclic Oxidation

Isothermal oxidation tests on the product produced by Example 1 were carried out in a horizontal tube-furnace. After a designed time period of exposure, the specimens were pulled out of the hot zone, cooled in a desiccator, then weighed with an electronic balance with an accuracy of 0.01 mg. Cyclic oxidation was performed in a vertical furnace. Oxidation in furnace and cooling in air periods were 60 min and 10 min, respectively. Under both testing conditions, the specimens were held in quartz crucibles. Therefore, scale spallation could be clearly observed and measured.

The isothermal and cyclic oxidation kinetics of the Ti(Al,O)/Al$_2$O$_3$ composite sample in air at 700° C., 800° C. and 900° C. were studied. In general, the kinetic behaviours for isothermal and cyclic tests were very similar for Ti(Al,O)/Al$_2$O$_3$, and could be fitted well with parabolic rate law, showing that the diffusion of reactants is the rate-controlling process during oxidation. The apparent oxidation rates were reasonably low, much lower than those of unalloyed Ti$_3$Al intermetallic compounds, but slightly higher than those of Ti$_3$Al-11 at. % Nb. The mass gains and parabolic rate constants measured are shown in Table 1.

TABLE 1

Data on Mass Gain of Ti(Al,O)/Al$_2$O$_3$ composite and Ti$_3$Al-based Alloys

| Alloy | Environment | Temperature/ °C. | Time/ hours | Mass Gain/mg/cm$^2$ |
|---|---|---|---|---|
| Ti-21 at. % Al | Air | 700 | 50 | 0.4 (I) |
| Ti-24Al-11Nb | | | 100 | 0.36 (I) |
| Ti(Al,O)/Al$_2$O$_3$ | | | 100 | 0.46 (I)/0.61 (C) |
| Ti-25Al | Air | 800 | 100 | 8.45 (I) |
| Ti-24Al-11Nb | | | 24 | 0.36 (I) |
| Ti$_3$Al-Nb | | | 100 | 2.07 (I) |
| Ti(Al,O)/Al$_2$O$_3$ | | | 30 | 1.38 (I)/1.40 (C) |
| Ti(Al,O)/Al$_2$O$_3$ | | | 100 | 2.33 (I)/2.09 (C) |
| Ti-25Al | Air | 900 | 100 | 108.5 (I) |
| Ti-24Al-11Nb | | | 24 | 1.18 (I) |
| Ti-24Al-11Nb | | | 100 | 3.86 (I) |
| Ti(Al,O)/Al$_2$O$_3$ | | | 30 | 4.31 (I)/3.53 (C) |
| Ti(Al,O)/Al$_2$O$_3$ | | | 100 | 8.12 (I)/6.38 (C) |

Note:
(I) - isothermal oxidation, (C) - cycling oxidation

An important feature of the Ti(Al,O)/Al$_2$O$_3$ sample was that no oxide layer or scale spallation could be observed anywhere under all testing conditions, evidence of superior scale adherence even under severe thermal cycling.

In correspondence with the similar oxidation kinetics, the surface and cross-section morphologies of the heat treated samples after isothermal and cyclic oxidation were also basically the same.

At 700° C., the oxide formed was a mixture of TiO$_2$ and Al$_2$O$_3$ in the form of small grains and whiskers. The oxide layer covered almost one half of the original surface area (i.e. the oxide layer was only formed on the top of the original Ti(Al,O) matrix (FIG. 4(a)). A very thin Al$_2$O$_3$ layer could be identified near the outer surface of the oxide layer, while the main body was composed of relatively dense TiO$_2$ with a small amount of Al$_2$O$_3$. The rugged reaction front penetrated into the substrate with a depth of about 10 μm. The interface between oxide layer newly formed and original α-Al$_2$O$_3$, and the interface between oxides and Ti(Al,O) matrix showed no sign of detachment, indicating excellent adhesion between these phases.

At 800° C., the Ti(Al,O)/Al$_2$O$_3$ surface was covered by large clusters of oxides forming the oxide layer. In comparison with the surfaces oxidised at 700° C., these clusters spread to cover more surface area. It could be seen that these clusters were composed of relatively small and dense oxide particles. EDS analysis showed that these were mainly rutile crystals with a small amount of α-Al$_2$O$_3$. A layer of Al$_2$O$_3$ formed underneath the surficial TiO$_2$ oxide layer. The original α-Al$_2$O$_3$ particles in the composite were still dense, showing no signs of cracking or spallation, and good adherence to the oxide particles newly formed and the unoxidised Ti(Al,O) matrix.

At 900° C., the oxide layer of Ti(Al,O)/Al$_2$O$_3$ specimens after isothermal and cyclic oxidation was covered with rutile crystals, which showed coarse size and random orientation. A multi-layered microstructure could be observed on the isothermal oxidised specimen. The outer face of the oxide layer is a thick rutile layer, under which is a nearly continuous alumina layer, then thick TiO$_2$ with a small amount of α-Al$_2$O$_3$. Porous layer of 5–10 μm was observed at the interface of oxide layer composite after isothermal oxidation. On the specimens after cyclic oxidation, however, very few pores could be seen at this interface. The penetration of the reaction front was similar for both isothermal and cyclic oxidation.

EXAMPLE 4

Oxidation Kinetics

In general, oxidation of the Ti(Al,O)/Al$_2$O$_3$ composite exhibits much lower rates in comparison with Ti$_3$Al inter metallic composite. As stated, isothermal and cyclic oxidation behaviours are very similar. Thermal stresses generated during cyclic oxidation do not result in oxide scale detachment or spallation. The oxide scales formed under both conditions have superior adhesion and spallation resistance.

As shown in Table 1 (above), the mass gains and the parabolic rate constants of Ti(Al,O)/Al$_2$O$_3$ composite are much lower than those of Ti$_3$Al intermetallic composite, but slightly larger than those of Ti$_3$Al-11 at. % Nb alloy—the best oxidation resistant alloy in Ti$_3$Al-Nb system.

The low oxidation rates of the Ti(Al,O)/Al$_2$O$_3$ composite may be partially attributed to the ~50 vol. % α-Al$_2$O$_3$ phase in the composite, which does not oxidise further. The inward diffusion and incorporation of oxygen through a reduced surface area, results in a low apparent oxidation rate. However, this does not completely account for the ~10 fold reduction in the oxidation mass gains.

The foregoing describes the invention including preferred forms thereof. Modification or alterations as would be apparent to a skilled person are intended to be included within the scope and spirit of the invention as defined in the attached claims.

What we claim is:

1. A titanium based composite which includes a (Al,O) base matrix, discrete ceramic particles, and an oxide layer on the surface of the composite, wherein the Ti(Al,O) base matrix includes between about 15 at. % and about 30 at. % Al, and the discrete ceramic particles are integrally associated with the (Al,O) base matrix and the oxide layer, and wherein, at a temperature of above about 600° C., the composite is substantially resistant to oxidation and/or spallation.

2. The composite according to claim 1 wherein the discrete ceramic particles range in size from about 0.1 μm to about 30 μm.

3. The composite according to claim 1 wherein the discrete ceramic particles are selected from Al$_2$O$_3$, SiC, TiC, TiN, TiB, —Y$_2$O$_3$ and/or Si$_3$N$_4$.

4. The composite according to claim 1 wherein the discrete ceramic particles constitute a volume fraction of about 10% to about 60% of the titanium based composite.

5. The composite according to claim 1 wherein the base matrix includes between about 0.1 at. % and about 30 at. % dissolved oxygen.

* * * * *